United States Patent
Ashtiani et al.

[11] Patent Number: 6,072,301
[45] Date of Patent: Jun. 6, 2000

[54] EFFICIENT RESONANT SELF-HEATING BATTERY ELECTRIC CIRCUIT

[75] Inventors: Cyrus N. Ashtiani, Bloomfield Hills, Mich.; Thomas A. Stuart, Toledo, Ohio

[73] Assignees: Chrysler Corporation, Auburn Hills, Mich.; University of Toledo, Toledo, Ohio

[21] Appl. No.: 09/175,627

[22] Filed: Oct. 20, 1998

[51] Int. Cl.$^7$ .................................................. H01M 10/44
[52] U.S. Cl. .......................................................... 320/128
[58] Field of Search ........................... 361/152–156; 320/103, 112, 118–120, 127, 124, 128, 130, 134, 135, 150, 152, 154, 166; 219/667, 668, 202, 209, 510

[56] References Cited

U.S. PATENT DOCUMENTS

| | | | |
|---|---|---|---|
| 4,209,736 | 6/1980 | Reidenbach | 320/22 |
| 5,760,488 | 6/1998 | Sonntag | 307/10.1 |
| 5,808,469 | 9/1998 | Kopera | 324/434 |
| 5,824,432 | 10/1998 | Currle | 429/120 |
| 5,831,514 | 11/1998 | Hilpert et al. | 340/309.15 |
| 5,982,142 | 11/1999 | Sullivan et al. | 320/118 |
| 5,990,661 | 11/1999 | Ashtiani et al. | 320/128 |

*Primary Examiner*—Ronald W. Leja

[57] ABSTRACT

A circuit for heating an energy storage device is disclosed. The circuit includes a switching device having a closed state and an open state. The circuit also includes a storage circuit for storing energy. The storage circuit has a resonating frequency. A controller is provided for operating the switching device. In operation, energy is transferred from the energy storage device to the storage circuit while the switching device is in the open state, and returned from the storage circuit to the energy storage device while the switching device is in the closed state. This energy transfer causes warming of the energy storage device.

20 Claims, 1 Drawing Sheet

EFFICIENT RESONANT SELF-HEATING BATTERY ELECTRIC CIRCUIT

BACKGROUND OF THE INVENTION

1. Technical Field

The present invention generally relates to a device for heating batteries. More particularly, the present invention is directed to an electrical circuit for using the stored energy of a battery and a resonant element to heat the battery or a group of batteries.

2. Discussion

The presently known battery technologies, including lead acid, NiCad, NiMH, or Li-Ion batteries used in electric or hybrid electric vehicles, or in conventional vehicles, need some form of heating at cold, particularly extreme cold temperatures before they become fully capable of supplying the power and energy for which they are designed. Traditional methods for warming starter batteries used in vehicles include leaving the headlights on for a few moments, or even applying a short at the battery terminals momentarily to warm the battery and increase its energy delivering capacity. These methods, including those using an external energy source to warm the battery, tend to waste a substantial amount of energy outside the battery in order to obtain a proportionately small increase in the battery internal temperature.

Accordingly, it is desirable to provide an electric self-heating battery circuit with a high degree of efficiency. The device and technique described herein uses the concept of resonance for creating a bidirectional flow of energy in the battery, back and forth between the positive and negative electrodes of the battery or battery pack. The bidirectional flow of energy is a natural consequence of resonance and results in an internal heating of the battery without wasting energy outside the battery itself. To set up the resonance, two different forms of energy storage are needed, an inductor that stores energy in the magnetic field as the current builds up in the inductor, and a capacitor that stores energy in the electric field as the voltage rises across the capacitor terminals. A switching device such as an IGBT or a MOSFET will be needed to excite the circuit natural frequency of oscillations according to the following criteria:

$$f_r = \frac{1}{2\pi\sqrt{LC}}$$

SUMMARY OF THE INVENTION

Pursuant to the present invention, an efficient circuit for self-heating an energy storage device is disclosed. The circuit includes a switching device having a closed state and an open state. The circuit also includes a storage circuit for storing energy. Additionally, the storage circuit has a resonating frequency. A controller is provided for operating the switching device. In operation, energy is transferred from the energy storage device to the storage circuit while the switching device is in the open state, and returned from the storage circuit to the energy storage device while the switching device is in the closed state. This energy transfer causes warming of the energy storage device.

BRIEF DESCRIPTION OF THE DRAWINGS

Additional objects, advantages and features of the present invention will become apparent from the following description and appended claims, taken in conjunction with the accompanying drawings in which:

DETAILED DESCRIPTION OF THE PREFERRED EMBODIMENT

Figure 1:
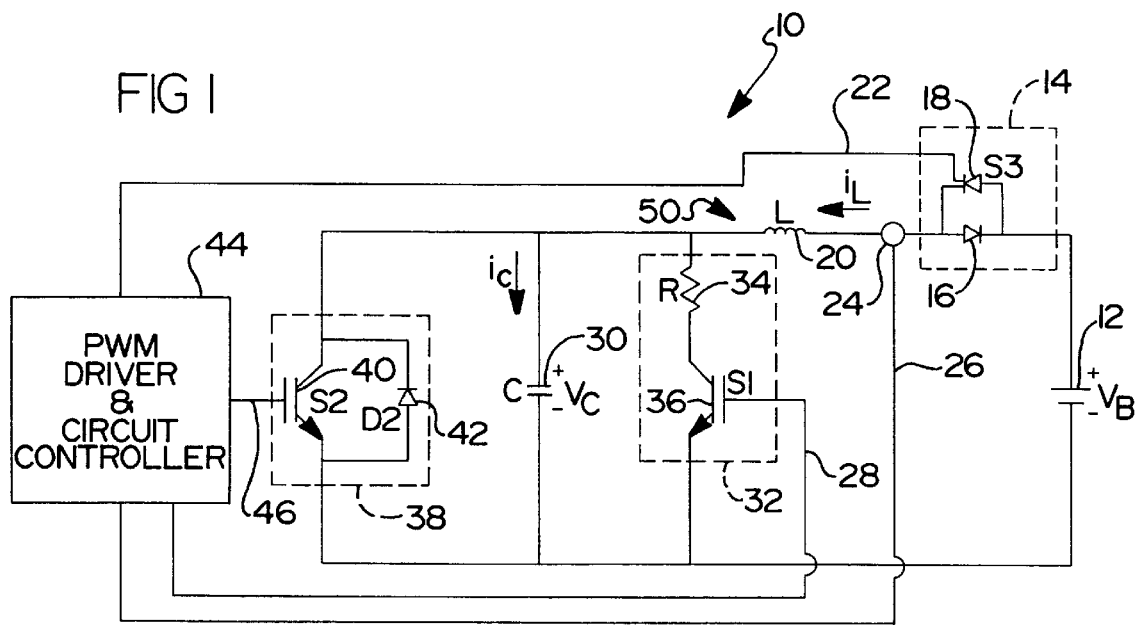
FIG. 1 is a schematic diagram showing the self-heating battery circuit in accordance with the teachings of the present invention.

The following description of the preferred embodiment is merely exemplary in nature and is in no way intended to limit the invention, its applications or uses. Referring now to FIG. 1, the self-heating battery circuit 10 according to the teachings of the present invention is shown. The preferred implementation of circuit 10 is that of a resonating circuit configuration operating at a frequency preferably in the range of 25 KHz. Circuit 10 is connected around an energy storage device such as battery 12. It should be understood that battery 12 may be a single energy storage cell, or a group of storage cells, such as those found in an electric or hybrid electric vehicle. The battery to be heated may range from a 12 volt combustion engine vehicle starter battery to a 600 volt battery pack for electric vehicles. Preferably, the battery 12 is a lithium ion (Li-Ion) battery because of its high power and light weight characteristics. However, a variety of energy storage devices including NiCad, NiMH or even lead acid batteries can utilize the circuit of the present invention to provide highly efficient warming.

An isolation circuit 14 is connected in series between the positive terminal of battery 12 and one terminal of an inductor 20. The other terminal of inductor 20 is connected in series with a capacitor 30 having its other terminal connected to ground. Isolation circuit 14 is formed by an anti-parallel diode 16 in parallel with a switched diode 18. The cathode of anti-parallel diode 16 and the anode of switched diode 18 are connected to battery 12. Diode 16 may be chosen from any of the high power diodes which are designed to handle high levels of current during normal operation. Diode 18 is preferably a silicon controlled rectifier (SCR) which can be appropriately switched through switching line 22 between the on state for conducting current and the off state for blocking the flow of current. The switching of diode 18 is preferably handled by controller 44, however, a variety of switching schemes may be used with the present invention.

As shown, inductor 20 and capacitor 30 form a series resonant circuit 50, which is capable of storing and discharging energy in an oscillatory manner, and which has an underdamped response. In its simplest form, this resonant circuit 50 is in series with battery 12. As disclosed, inductor 20 is also chosen for handling the large current levels encountered during normal operation. Additionally, circuit 10 should be operated over a frequency range that minimizes the inductor weight and size without creating excessive overall losses in the inductor core, coil, and switching losses of the power semiconductor switches. Capacitor 30 is also chosen to be appropriate for high power operation. Suitable capacitors may include ceramic, polypropylene, plastic film, plastic foil, oil-filled, aluminum electrolytic, and tantalum electrolytic capacitors. The operation of this LC resonant circuit 50 will be described in greater detail below.

Circuit 10 also includes a discharge circuit 32 which by design is only used at startup to remove any residual charge from the capacitor 30. Discharge circuit 32 functions to protect transistor 40, which would draw a high current surge from capacitor 30 if this capacitor is charged when transistor 40 is turned on. However, it is contemplated that discharge circuit 32 could also be used after the battery 12 is sufficiently warmed for discharging capacitor 30. Discharge circuit 32 includes resistor 34 of which one terminal is connected to the node between inductor 20 and capacitor 30. The other terminal of resistor 34 is connected to a power switching transistor 36 which is in turn connected to ground which is the negative terminal of battery 12. Transistor 36, and thus discharge circuit 32 can be controlled by the circuit controller 44 or any other suitable control source, such as the ignition circuit of the vehicle. Preferably, transistor 36 is an insulated gate bipolar transistor (IGBT) for handling large amounts of current when capacitor 30 is discharged. When transistor 36 is turned on, any residual charge stored within capacitor 30 will be conducted through resistor 30 to ground. After initially used, discharge circuit 32 is no longer used during the normal heating operation performed by the resonating circuit.

Control of the battery warming operation is primarily controlled by switching circuit 38 which includes transistor 40 and anti-parallel diode 42, both being connected in parallel with capacitor 30. Preferably, transistor 40 is also an IGBT which is switched between the conducting state and the non-conducting state by a pulse width modulation (PWM) controller in the circuit controller 44 via transistor control line 46. As disclosed, the anode of anti-parallel diode 42 is connected to ground for providing a reverse or negative current path when transistor 40 is in the non-conducting or off state. The presently preferred embodiment of circuit 10 includes a pair of IGBTs 36, 40 for performing the requisite switching operations. However, the principles of the invention may be extended to the use of other switching devices such as MOSFET's, BJT's, and MCT's.

In operation, the preferred embodiment of battery warming circuit 10 employs pulse width modulation at any number of frequencies such as a typical value of 25 kilohertz. As can be appreciated, the size and weight of inductor 20 and capacitor 30 will decrease as the operating frequency is increased, but circuit losses will increase. However, the principles of the invention may be readily extended to a circuit employing frequency modulation. As is known in the art, pulse-width modulators control a circuit by operating at a fixed frequency and varying the pulse-width in response to a controlling input. A frequency modulator controls a circuit by varying the total period of the signal.

Figure 2:
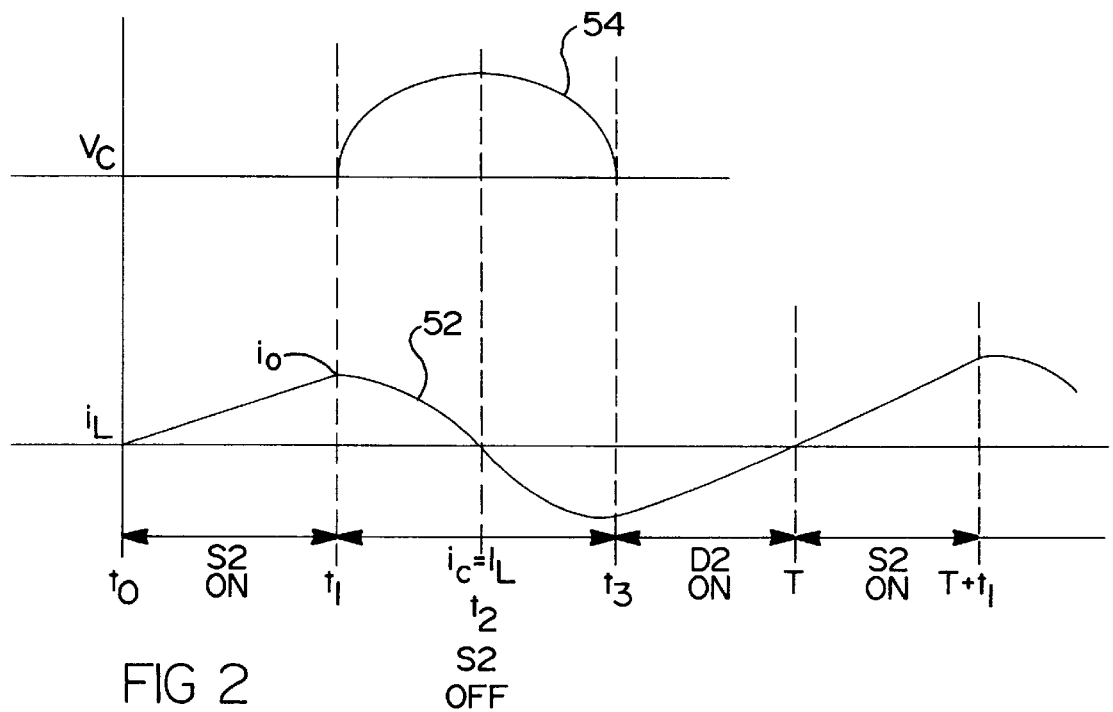
FIG. 2 is a wave form diagram showing the voltage and current wave forms associated with the preferred embodiment of the present invention.

Referring now to FIG. 2, the operation of circuit 10 and its components will be described in more detail. FIG. 2 includes two waveforms, the lower waveform 52 representing the current $i_L$ through inductor 20, and the upper waveform 54 representing the voltage $V_C$ across capacitor 30. It should also be noted that the current $i_L$ can be monitored by controller 44 via current monitor 24 and current level feedback line 26. Additionally, the controller 44 can control the frequency of the PWM signal provided to transistor 40 in response to the current feedback signal from line 26. FIG. 2 shows one complete cycle during normal warming operation of circuit 10, and this cycle may be repeated as many times as necessary for sufficiently warming battery 12.

When circuit 10 is not being utilized, SCR 18 is maintained in the off or non-conducting state to prevent any current flow from battery 12. Diode 16 also prevents any current flow from battery 12 due to its orientation within isolation circuit 14. Accordingly, isolation circuit 14 effectively separates circuit 10 from battery 12 during periods when warming circuit 10 is not used.

At startup, the following sequence of events is performed for placing circuit 10 into a steady state operating mode. Initially, transistor 36 (S1) is turned on for removing any residual charge from capacitor 30. After transistor 36 is turned off, transistor 40 (S2) and SCR 18 (33) are turned on so that inductor 20 has a pathway to ground, and current begins conducting from battery 12. At this point, discharge circuit 32 has performed its function and is not again switched on until the next startup sequence. As will be appreciated, SCR 18 is maintained in the on state during the steady state operation of circuit 10. Additionally, circuit 10 is switched off by turning off SCR 18 and isolating battery 12. Thus, during steady state operation of circuit 10, SCR 18 remains on and transistor 36 remains off.

Upon completion of the startup switching sequence, circuit 10 is maintained in a steady state operating mode for warming battery 12, and the only switching is performed by transistor 40 (S2). With continued reference to FIG. 2, starting time $t=t_0$ to represents the point in the cycle when transistor 40 is turned on. When this switch S2 is closed, inductor 20 is connected across the battery 12 at the full voltage $V_B$. As represented by the waveform 52 for $i_L$, current builds up linearly in inductor 20 while the voltage $V_C$ across capacitor 30 remains nearly zero; equal to the conduction voltage of transistor 40. This is the initial stage of energy transfer during which energy is first transferred from battery 12 to inductor 20. At time $t_1$, transistor 40 is turned off. The turn off of transistor 40 is virtually lossless because the capacitor 30 is literally an electrical short for maintaining the voltage across transistor 40 near zero during the switch-off time period. In addition, the inductor current will be smoothly transferred from the switch path to the parallel path of capacitor 30 without interrupting the inductor current $i_L$ continuity, which tends to cause undesirable high voltage spikes.

The turn-off of transistor 40 at time $t_1$ commences the second stage of the current flow or energy transfer, in which current starts decreasing in the inductor-capacitor-battery loop, but the direction of the current flow is the same until the inductor current $i_L$ reaches zero at time $t_2$. During this second stage, the voltage $V_C$ across capacitor 30 builds up sinusoidally to its peak value as represented by waveform 54 in FIG. 2. From the energy standpoint, the energy transfer takes place from the inductor 20 to the capacitor 30. The current then reverses at time $t_2$, and begins flowing in the opposite direction. This is the onset of the third stage. The current $i_L$ continues building up in the opposite direction while the capacitor voltage $V_C$ falls sinusoidally and the switch 52 remains open or off.

At time $t_3$, the capacitor voltage $V_C$ reaches zero while the inductor current $i_L$ is at its negative peak (i.e. in the opposite direction). During this stage, the energy has been transferred back from the capacitor 30 and into the inductor 20, and the reversal of the energy flow has now set the stage for returning the remaining energy back into the battery 12. At this point, anti-parallel diode 40 (D2) begins conducting because of the negative direction of the inductor current $i_L$.

Since the direction of the current set by resonance is against the polarity of battery 12, at this fourth and final stage of the cycle, energy is returned from inductor 20 back to the battery pack 12. This occurs because the direction of the current flow is opposite to the polarity of the battery voltage $V_B$, which in this stage will be directly connected across the inductor 20.

Once the remaining energy from inductor 20 is transferred back into battery 12, transistor 40 is switched back on to begin a new energy transferring cycle. As one skilled in the art will appreciate, this cycled transfer of energy (current) between battery 12 and resonating circuit 50 provides a highly efficient means for warming the battery pack, especially at the high current levels for which battery warming circuit 10 is designed.

The many efficiencies achieved by circuit 10 will be fully appreciated by one skilled in the art. For example, because the capacitor voltage $V_C$ has reached zero volts when transistor 40 is switched back on (beginning of a new cycle), this switching is again performed at zero voltage (across transistor 40) and the switching loss is almost negligible. Thus, as a result, the switching at turn-on and turn-off occurs at zero voltage, making the device switching losses almost negligible, even at higher frequencies. Moreover, the resonant circuit is naturally efficient as represented by its classic underdamped response (oscillatory waveform). Thus, while as disclosed, transistor 40 is switched on and off for every resonating cycle, it is also within the scope of the present invention to switch transistor 40 at every nth cycle, such as every second or third cycle. The efficiency of warming circuit 10 can also be maximized by choosing inductor and capacitor components which have minimal losses.

From the foregoing it will be understood that the invention provides a circuit that employs a low loss network for using the internal energy of a battery to heat either the battery or battery pack. The circuit may be readily scaled by selection of appropriate switching devices and energy storage devices to accommodate different quantities of batteries, different types of batteries, and different methods of storing the intermediate energy. The circuit thus provides a novel and efficient means for heating batteries in a wide range of applications.

Through the use of a low loss switched energy storage network, the invention can provide an efficient and low cost means for increasing the effective operating temperature range of batteries and improving the utilization of the energy stored within batteries operating within low temperature environments. Additionally the invention improves the low temperature charging efficiency of a battery. Moreover, the circuit enhances the portability of systems that employ batteries by providing means for using energy stored within the battery to self heat the battery. The invention is therefore ideally suited for heating electric vehicle battery assemblies, as well as batteries used with hand held power tools. The circuit will heat both multiple batteries and single batteries using either variable frequency modulation or pulse-width modulation.

The foregoing discussion discloses and describes exemplary embodiments of the present invention. One skilled in the art will readily recognize from such discussion, and from the accompanying drawings and claims, that various changes, modifications, and variations can be made therein without departing from the spirit and scope of the invention as defined in the following claims.

What is claimed is:

1. A circuit for heating an energy storage device comprising:
   a switching device having a closed state and an open state;
   a storage circuit for storing energy; and
   a controller for operating the switching device;
   whereby energy is transferred from the energy storage device to the storage circuit while the switching device is in the open state, and returned from the storage circuit to the energy storage device while the switching device is in the closed state.

2. The circuit of claim 1 wherein the storage circuit is a resonating circuit having a resonating frequency.

3. The circuit of claim 2 wherein the controller opens and closes the switching device at an operating frequency of the circuit.

4. The circuit of claim 1 further including a discharge circuit for removing residual energy from the storage circuit.

5. The circuit of claim 1 further including an isolation circuit connected between the energy storage device and the storage circuit.

6. A circuit for heating a battery comprising:
   a switch having a closed state and an open state;
   a storage circuit for temporarily storing electrical energy, said storage circuit having a resonating frequency; and
   a controller for operating the switch, said controller opening and closing the switch at an operating frequency of the circuit;
   whereby energy is transferred from the battery to the storage circuit while the switch is in the open state, and returned from the storage circuit to the battery while the switch is in the closed state.

7. The circuit of claim 6 wherein the storage circuit includes an inductor disposed in series with a capacitor.

8. The circuit of claim 7 wherein energy is transferred between the inductor and the capacitor.

9. The circuit of claim 7 further including a discharge circuit for removing residual energy from the capacitor.

10. The circuit of claim 9 wherein the discharge circuit includes a resistor and a switch for conducting electrical energy away from the capacitor.

11. The circuit of claim 7 further including an isolation circuit disposed between the battery and the inductor for controlling the flow of current therebetween.

12. The circuit of claim 11 wherein the isolation circuit includes a switched diode device for conducting current in a first direction, and an anti-parallel diode for conducting current in a second opposite direction.

13. The circuit of claim 6 further including a current monitor disposed between the battery and the storage circuit, the current monitor providing a current feedback signal to the controller.

14. The circuit of claim 13 wherein the controller changes operation of the switch in response to the current feedback signal.

15. A resonating circuit for warming a battery using energy stored therein comprising:
   a switch having a closed state and an open state;
   an LC circuit connected to the battery for temporarily storing electrical energy, said LC circuit including an inductor and a capacitor in series having a resonating frequency;
   a discharge circuit for removing residual energy from the capacitor;
   an isolation circuit connected between the battery and the LC circuit;
   a controller having a pulse width modulation circuit for operating the switch, said pulse width modulation circuit opening and closing the switch at an operating frequency of the circuit;
   whereby energy is transferred from the battery to the LC circuit while the switch is in the open state, and returned from the LC circuit to the battery while the switch is in the closed state.

16. The resonating circuit of claim 15 wherein the discharge circuit includes a resistor and a switch for conducting electrical energy away from the capacitor.

17. The resonating circuit of claim 15 wherein the isolation circuit includes a switched diode device for conducting current in a first direction, and an anti-parallel diode for conducting current in a second opposite direction.

18. The resonating circuit of claim 15 further including a current monitor disposed between the battery and the LC circuit, the current monitor providing a current feedback signal to the controller.

19. The resonating circuit of claim 18 wherein the controller changes the pulse width provided to the switch in response to the current feedback signal.

20. The resonating circuit of claim 15 further including a diode connected in parallel with the switch, the diode being disposed for conducting current in a direction opposite that of the switch during a time period when the switch is in the open state.

* * * * *

UNITED STATES PATENT AND TRADEMARK OFFICE
CERTIFICATE OF CORRECTION

PATENT NO : 6,072,301
DATED : June 6, 2000
INVENTOR(S) : Cyrus N. Ashtiani and Thomas A. Stuart It is certified that error appears in the above-identified patent and that said Letters Patent are hereby corrected as shown below:

Column 1, after the title please insert the following new heading and title:

--STATEMENT REGARDING FEDERALLY SPONSORED RESEARCH OR DEVELOPMENT

This invention was made with Government support under NREL subcontract number ZAN-6-16334-01, prime contract number DE-AC36-83CH10093 issued by the Department of Energy. The government has certain rights in this invention."--

Signed and Sealed this

Twenty-fourth Day of April, 2001

Attest:

NICHOLAS P. GODICI

Attesting Officer

Acting Director of the United States Patent and Trademark Office